(12) United States Patent
Diehl et al.

(10) Patent No.: US 8,839,486 B2
(45) Date of Patent: Sep. 23, 2014

(54) PRESS-IN ELEMENT, PRE-INSTALLATION COMPONENT, COMPONENT ASSEMBLY AND METHOD

(71) Applicant: PROFIL Verbindungstechnik GmbH & Co. KG, Friedrichsdorf (DE)

(72) Inventors: Oliver Diehl, Bad Homburg v.d.H. (DE); Richard Humpert, Bad Nauheim (DE)

(73) Assignee: PROFIL Verbindungstechnik GmbH & Co. KG, Friedrichsdorf (DE)

( * ) Notice: Subject to any disclaimer, the term of this patent is extended or adjusted under 35 U.S.C. 154(b) by 0 days.

(21) Appl. No.: 13/779,726

(22) Filed: Feb. 27, 2013

(65) Prior Publication Data

US 2013/0223923 A1 Aug. 29, 2013

(30) Foreign Application Priority Data

Feb. 29, 2012 (DE) .......................... 10 2012 003 972

(51) Int. Cl.
| | |
|---|---|
| *F16L 5/00* | (2006.01) |
| *F16B 5/04* | (2006.01) |
| *F16B 19/08* | (2006.01) |
| *F16B 37/06* | (2006.01) |
| *B21K 1/60* | (2006.01) |
| *B21J 15/02* | (2006.01) |

(52) U.S. Cl.
CPC . *F16B 19/08* (2013.01); *F16B 5/04* (2013.01); *F16B 19/086* (2013.01); *F16B 37/065* (2013.01); *F16B 37/068* (2013.01); *B21K 1/60* (2013.01); *B21J 15/025* (2013.01)
USPC ............ 16/2.1; 29/525.06; 29/798; 29/432.1; 29/432.2; 411/501

(58) Field of Classification Search
USPC ........... 16/2.1–2.5; 29/243.519, 432.1, 432.2, 29/512, 520, 525.06, 798; 411/173, 179, 411/180, 181, 183–185, 187, 501, 967, 503
See application file for complete search history.

(56) References Cited

U.S. PATENT DOCUMENTS

| 3,204,679 A | | 9/1965 | Walsh |
| 4,525,912 A | * | 7/1985 | Kazino et al. ............ 29/243.519 |

(Continued)

FOREIGN PATENT DOCUMENTS

| DE | 1 400 934 A | 3/1969 |
| DE | 197 10 246 A1 | 9/1998 |

(Continued)

OTHER PUBLICATIONS

Translation of the Extended European Search Report mailed on Jun. 5, 2013 in corresponding European Application No. EP 13 15 6240.7.

(Continued)

*Primary Examiner* — William Miller
(74) *Attorney, Agent, or Firm* — Hershkovitz & Associates, PLLC; Abraham Herhskovitz; Eugene Rzucidlo

(57) ABSTRACT

The present invention relates, amongst other things, to a punch-in element having a hollow head part of larger transverse dimension and a hollow shaft part of smaller transverse dimension which projects away from one side of the head part, wherein a ring-like sheet metal contact surface is formed at the said side of the head part and surrounds the shaft part, with a plurality of ribs at the outer periphery of the shaft part which extend in the axial direction along the shaft part from the sheet metal contact surface to close to the free end of the shaft part. A pre-installation component, a component assembly and a method is also claimed.

6 Claims, 7 Drawing Sheets

(56) References Cited

U.S. PATENT DOCUMENTS

| | | | |
|---|---|---|---|
| 4,966,512 A | 10/1990 | Takaku | |
| 5,309,618 A * | 5/1994 | Muller | 29/432.2 |
| 5,445,483 A | 8/1995 | Fultz | |
| 5,528,812 A | 6/1996 | Müller | |
| 5,564,873 A * | 10/1996 | Ladouceur et al. | 411/180 |
| 7,318,696 B2 | 1/2008 | Babej et al. | |
| 8,096,743 B2 * | 1/2012 | Babej | 411/179 |
| 8,221,040 B2 * | 7/2012 | Babej et al. | 411/183 |
| 8,328,485 B2 * | 12/2012 | Babej et al. | 411/181 |
| 2011/0067478 A1 | 3/2011 | Babej | |

FOREIGN PATENT DOCUMENTS

| | | |
|---|---|---|
| DE | 10 2005 006 396 A1 | 9/2005 |
| DE | 695 33 969 T2 | 1/2006 |
| DE | 10 2006 062 073 A1 | 7/2007 |
| EP | 1 806 508 A2 | 7/2007 |
| EP | 2 177 776 A2 | 4/2010 |
| EP | 2 302 234 A2 | 3/2011 |
| WO | WO 02/086337 A1 | 10/2002 |
| WO | WO 2006/119401 A2 | 11/2006 |

OTHER PUBLICATIONS

English Abstract of WO 2002/086337 A1.
English Abstract of EP 2 302 234 A2.
English Abstract of DE 197 10 246 A1.
German Search Report issued Dec. 12, 2012 in German Patent Application No. 10 2012 003 972.7.
English translation of German Search Report.
English Abstract of DE 10 2005 006 396 A1.
English Abstract DE 10 2006 062 073 A1.
English Abstract DE 695 33 969 T2.
English Abstract EP 1 806 508 A2.
English Abstract EP 2 177 776 A2.

* cited by examiner

111
PRESS-IN ELEMENT, PRE-INSTALLATION COMPONENT, COMPONENT ASSEMBLY AND METHOD

RELATED APPLICATIONS

The present application claims priority under 35 U.S.C. 119 of German Patent Application No. 10 2012 003 972.7, filed on Feb. 29, 2012, the disclosure of which is expressly incorporated by reference herein in its entirety.

FIELD OF THE INVENTION

The present invention relates to a punch-in element having a hollow head part of larger transverse dimension and a hollow shaft part of smaller transverse dimension which projects away from one side of the head part, with a ring-like sheet metal contact surface being formed at the said side of the head part and surrounding the shaft part, to a pre-installation component consisting of the punch-in element and at least one sheet metal part, to a component assembly consisting of the pre-installation component and a further sheet metal part and also to a method for the manufacture of the component assembly.

BACKGROUND OF THE INVENTION

A punch-in element of this kind is known from EP-A-23022344. It is intended for punching into a single thick sheet metal part and is provided with a plurality of ribs at the outer periphery of the shaft part which extend in the axial direction along the shaft part from the sheet metal contact surface over approximately half the length of the shaft part.

Moreover, a rivet element is known from EP-A-1806508 which is equipped with a rivet section having ribs providing security against rotation extending in the longitudinal direction which extend over the full length of the rivet section. A strict distinction is, however, made in the area of functional elements or fastener elements between press-in elements on the one hand and rivet elements on the other hand and indeed because press-in elements are not intentionally deformed on attachment to the sheet metal part, whereas rivet elements are intentionally deformed in order to form the rivet bead which is important for the component assembly consisting of a rivet element and a sheet metal part. The design of the two types of functional elements or fastener elements is thus fundamentally different.

A further rivet element is known from EP-A-2177776. This element is also intended for attachment to a single pre-pierced thick sheet metal part. Its shaft part has a thick walled hollow section and a thin hollow rivet section at the free end. The thick walled section is provided with ribs extending in the longitudinal direction which extend over substantially the full length of the thick walled section, the rivet section is however not provided with ribs.

None of the above-described elements is intended for the attachment to a first and a second sheet metal part or designed for this. In practice, above all in the field of bodywork, applications are repeatedly arising in which a functional element has to be attached to a first and to a second sheet metal part, with the attachment to the first sheet metal part taking place at one location in a factory whereas the attachment to the second sheet metal part takes place at a different location in the same factory or in a different factory. The first sheet metal parts with the attached functional elements are frequently transported loosely in boxes from one location to the other and are thus subjected to jolts and frequently rough handling which can lead to a loosening of the functional element in the first sheet metal part, or indeed to the two parts falling apart, so that they are no longer fit for attachment to the second sheet metal part or can only be used with a great effort. This is a considerable problem, especially in mass production.

An example for such a component assembly is the attachment of hinges to door posts of vehicle bodies. The door posts are normally manufactured from a relatively thin sheet metal, in particular when they are part of the outer skin of the vehicle. It is then known to attach nut elements to a so-called boat, which is formed by a thicker sheet metal part, which frequently has a flat bent U-shape in cross-section and which is welded to the door post from the inner side for stiffening. In the design of the door hinges and the attachment to a door post, attention must always be paid to the fact that a relatively heavy person of for example 150 kg body weight can brace themselves against the door frame on climbing in and climbing out, whereby considerable lever forces have to be taken up by the door post without it deforming.

SUMMARY OF THE INVENTION

The object underlying the present invention is to provide a punch-in element which is particularly intended for the attachment to the first and second sheet metal parts, with the attachment of the first sheet metal part on the one hand being secure so that loosening of the element from the first sheet metal part need not be feared and so that the attachment to a second sheet metal part can be achieved without problem without having to pay attention to the particular orientation of the element.

Furthermore, in accordance with the invention, a pre-installation unit consisting of the element and the first sheet metal part and a finished component assembly consisting of a pre-installation unit and a second sheet metal part should be made available which can be made stably and at favorable price as well as also providing a corresponding manufacturing method for the component assembly.

At this point it should be emphasized that when the talk here is of a first sheet metal part and a second sheet metal part a sheet metal part of this kind can also be formed of several layers, with the plural layers of one sheet metal part for example being welded to one another or adhesively bonded to one another. By way of example, the first sheet metal part can consist of two or more welded together sheet metal parts and the second sheet metal part can also be.

In order to satisfy this object a punch-in element of the initially named kind is provided in accordance with the invention which is characterized in that the ribs extend from the ring-shaped sheet metal contact surface up to close to the free end of the shaft part.

When it is stated that the ribs extend from the ring-shaped sheet metal contact surface up to close to the free end of the shaft part this signifies that they extend from the ring-shaped sheet metal contact surface or close to the ring-shaped sheet metal contact surface over at least 80% of the total length of the shaft part.

In this connection, the ribs are preferably arranged uniformly distributed around the outer periphery of the shaft part.

Both the head part and also the shaft part are preferably made hollow, with a thread cylinder being formed in the head part and in the shaft part.

An alternative design of the punch-in elements in accordance with the invention comprises a punch-in element wherein a bolt shaft with an external thread is formed at the other side of the head part.

The pre-installation unit in accordance with the invention includes at least one first pre-pierced sheet metal part into which at least one punch-in element is pressed with its free end to the fore so far that an end part of the shaft part projects out of the sheet metal part and so that some but not all of the longitudinal ribs are fully or partly displaced from the end part of the shaft part and have been reshaped into material noses, i.e. are sheared and compressed, with the material noses engaging partly or fully into the material of the sheet metal part or contacting the sheet metal part, whereby the sheet metal part is clamped between the noses and the sheet metal contact surface and the remaining non-displaced longitudinal ribs are still present at the end part.

Through the material noses the punch-in element is thus attached in a form-fitted and rotationally-secure manner to the first sheet metal part and indeed such that a connection arises with which a loosening of the element in the first sheet metal part or indeed an undesired separation is not to be feared. As will be explained in more detail it is not necessary that the manufacture of the pre-installation unit has to observe a particular rotational position of the element nor a corresponding rotational position of the die button that is used.

This pre-installation unit can then be completed with a second non pre-pierced sheet metal component to form a component assembly in accordance with the invention in that the end part is self-piercingly introduced into the second sheet metal part, with the formation of a hole in the second sheet metal part, whereby the remaining, non-displaced longitudinal ribs, which are still present at the end part, engaging in form-fitted manner in grooves of the rim of the hole which arise on the pressing-in of the pre-installation unit.

Thus, the pre-installation unit is also rotationally securely connected, and is also secure against press-out at the free end to the second sheet metal part—as a result of the high hole friction.

It is particularly favorable when a ring recess is provided in the side of the second sheet metal part remote from the first sheet metal part which surrounds the end part.

In this way the hole friction is increased, whereby also the press-out resistance is increased.

During the manufacture of the component assembly, the shaft part is at least substantially not deformed in the area of the thread.

The method of the invention for the manufacture of a pre-installation unit consisting of a sheet metal part and a punch-in element of the above-described kind and as claimed in claim 1, is carried out so that the sheet metal part is pre-pierced with a hole diameter which corresponds to the diameter of the shaft part, in that the sheet metal part is supported on a die button having a passage which has at least first and second alternating regions around the passage, with the first regions having a radius from the central longitudinal axis of the punch-in element which corresponds to the radius of the shaft part and the second regions having a radius from the central longitudinal axis of the punch-in element which corresponds to the radius of the outer side of the longitudinal ribs from the central longitudinal axis of the punch-in element.

In this way some but not all of the longitudinal ribs are reshaped to material noses of the above-described kind. In this connection it does not play any role whether these first regions engage one or two longitudinal ribs fully or partly, since the remaining longitudinal ribs at the end part, be they fully or partly displaced longitudinal ribs, are sufficient for the rotationally secure attachment to the second sheet metal part. There seem to be a different number of longitudinal ribs and first regions and/or a different angular extent of the longitudinal ribs and of the first regions so that only some of the longitudinal ribs or parts thereof are scraped away by the first regions. Normally fewer first regions are provided than are longitudinal ribs.

Furthermore, the present invention relates to a method for the manufacture of a component assembly consisting of the above-described pre-installation component and a second sheet metal part, with the second not pre-pierced sheet metal part being supported on a die button having a central passage and a diameter corresponding to the base diameter of the end part of the shaft part of the punch-in element and having a ring nose arranged around the central passage, whereby, through pressing of the pre-installation unit with the end face of the end part to the fore against the side of the second sheet metal part remote from the die button, the end part generates a hole in the second sheet metal part and a piercing slug with the aid of the die button, and a ring nose forms a ring recess in the side of the second sheet metal part remote from the head part around the end part.

However, here also it is not necessary to observe a special orientation of the pre-installation component or of the second die button since the remaining longitudinal ribs or longitudinal rib parts at the end part do not come into contact with the second die button, particularly as in the installed state the free end of the shaft part does not project beyond the side of the second sheet metal part remote from the head part but rather preferably is set back from the latter, for example by 0.02 mm.

BRIEF DESCRIPTION OF THE FIGURES

The invention will now be described with reference to embodiment and to the drawings in more detail in which are shown:

FIGS. 1A-1B perspective illustrations of a punch-in element in accordance with the invention in which the shaping of the element is evident from both ends, FIGS. 2A-2E representations as to how the punch-in element is introduced into a first sheet metal part and how the pre-installation unit formed hereby looks, wherein

DETAILED DESCRIPTION OF THE INVENTION

Figure 1A:
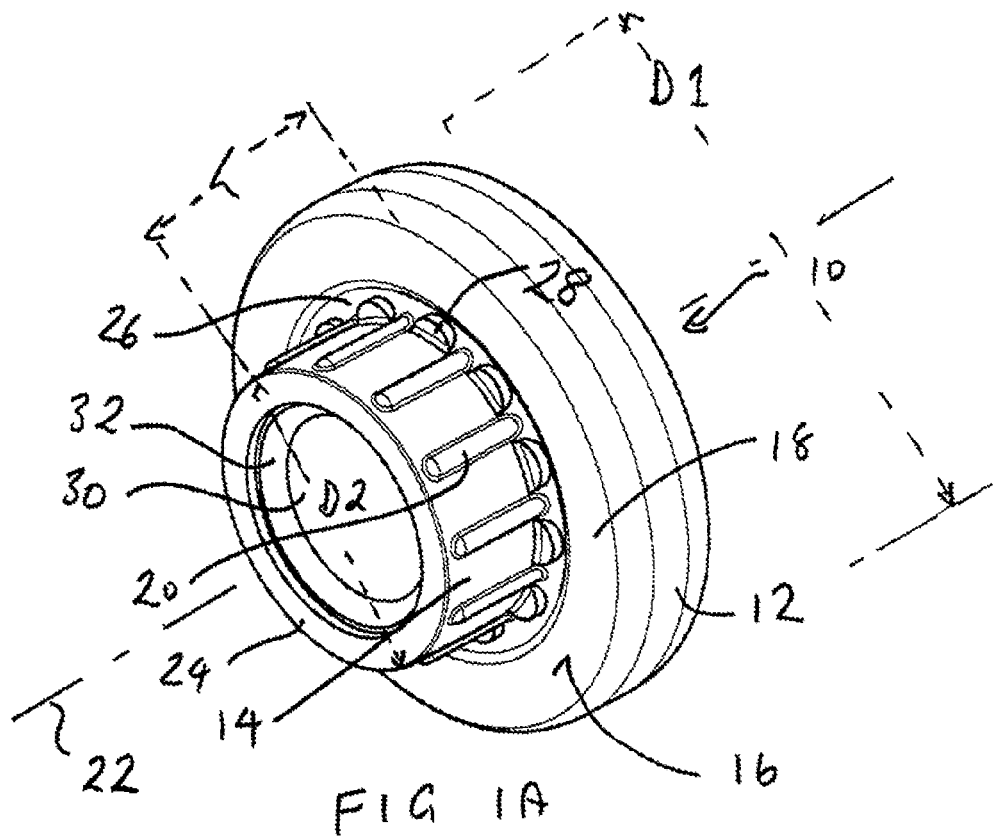
Figure 1B:
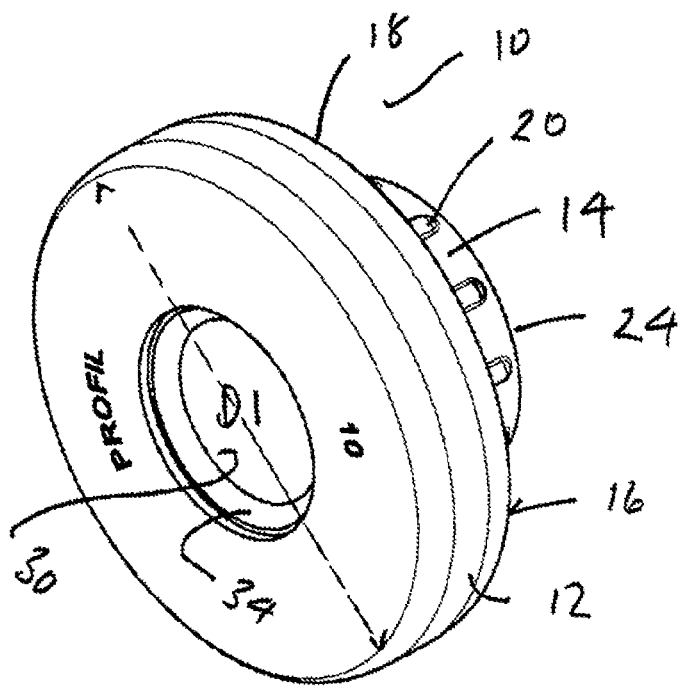
Figure 2A:
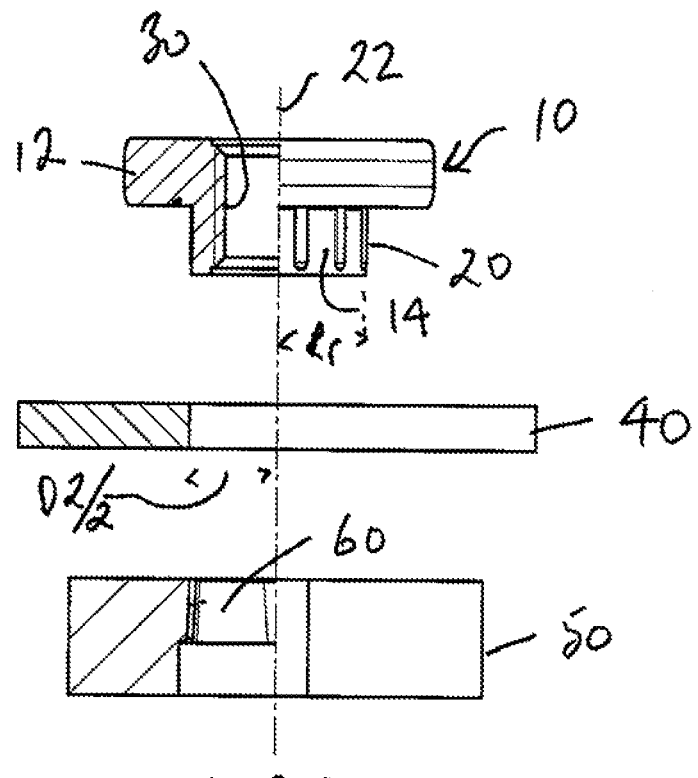
FIG. 2A shows the punch-in element above the pre-pierced first sheet metal part with the die button lying beneath it.
Figure 2B:
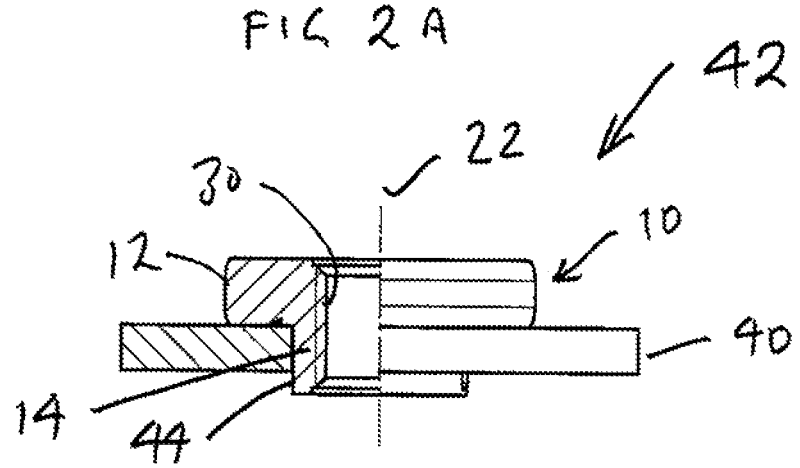
FIG. 2B shows the finished pre-installation unit in a state partly sectioned in a longitudinal direction.
Figure 2C:
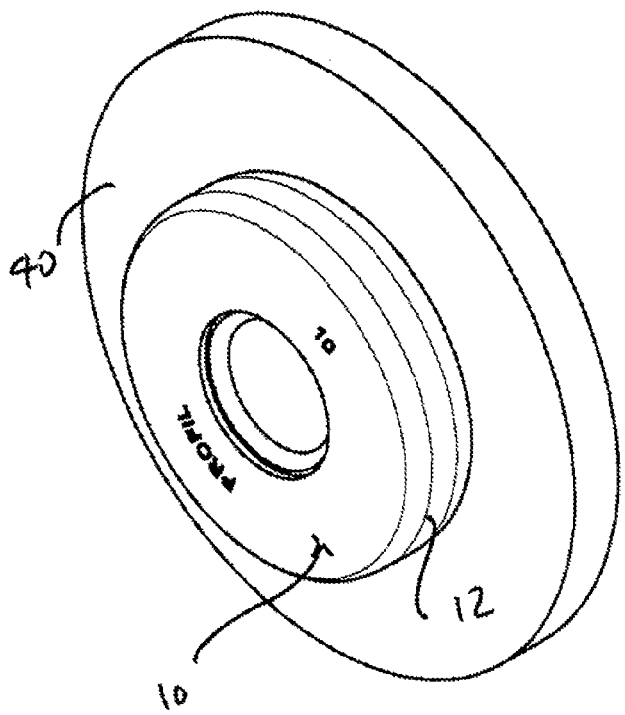
FIGS. 2C and 2D show perspective illustrations of the finished pre-installation components in accordance with FIG. 2B from both sides and the FIG. 2E shows an enlarged representation of the of the circle region of FIG. 2D, FIGS. 3A-3C the die button used in FIG. 2A in a perspective illustration (FIG. 3A), in a view sectioned in the longitudinal direction (FIG. 3B) and in an end view (FIG. 3C), FIGS. 4A-4B the attachment of the pre-installation component in accordance with the invention and FIGS. 2B to 2E, to a second component with the aid of a second die button (FIG. 4A) for the formation of a component assembly in accordance with the invention (FIG. 4B)
Figure 2E:
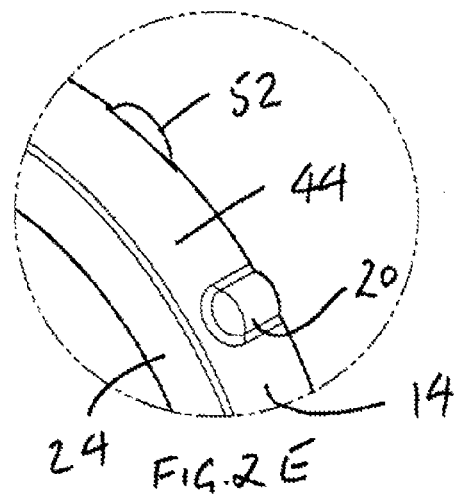
Figure 2D:
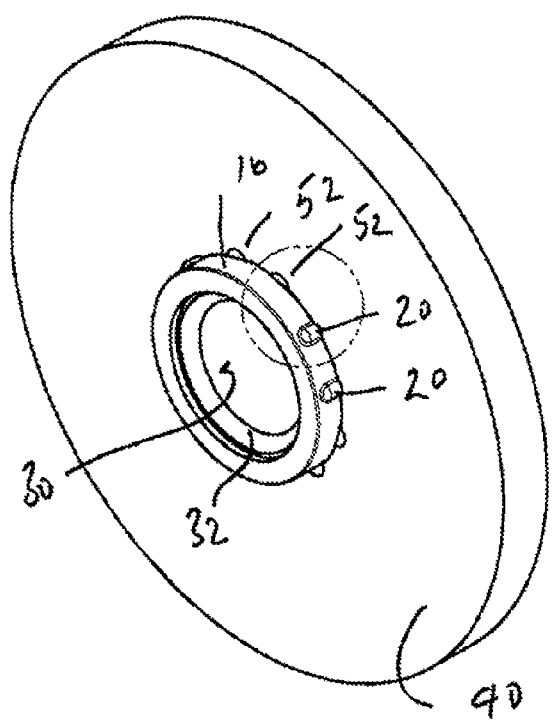

Referring to FIGS. 1A and 1B a punch-in element 10 is shown there with a hollow head part 12 with a larger transverse dimension D1 and with a hollow shaft part 14 of a smaller transverse dimension D2 which projects away from one side 16 of the head part 12, with a ring-shaped sheet metal contact surface 18 being formed at the named side 16 of the head part 12 and surrounding the shaft part 14. The punch-in element 10 is provided with a plurality of ribs 20 at the outer periphery of the shaft part 14 which extend in the axial direction (in the direction of the central longitudinal axis 22) along the shaft part 14 from the sheet metal contact surface 18 up to close to the free end 24 of the shaft part 14. D1 is for example—without restriction—approximately twice as large as D2.

Here the ribs extend, starting from the named side, over the full length of the shaft part 14. This is however not compulsory, they could extend over at least 80% of the total length L of the shaft part and they could, for example, without restriction, finish by an amount 0.1 L from the end face 24 of the shaft part 14 and finish by an amount of 0.1 L in front of the sheet metal contact surface 18. The preferred construction is however evident from FIG. 1A in which the longitudinal ribs finish at an axial ring groove 26 radially inside the sheet metal contact surface 18, with material accumulations 28 being located between the longitudinal ribs and likewise being contained in the axial ring groove 26. This has technical manufacturing advantages, since the longitudinal ribs 20 can be manufactured by cold heading from a ring shoulder of a pre-finished blank with an axial ring groove in such a way that material from the regions between the longitudinal ribs is scraped away by a suitable tool and leads to the material accumulations 28 as is described in a further application of the present applicants. This design has the advantage that no features other than the shaft part with the longitudinal ribs 20 are present before the sheet metal contact surface 18 so that the sheet metal contact surface can lie closely to one side of the first sheet metal part.

The ribs 20 are here arranged distributed in uniform manner around the outer periphery of the shaft part 14. This is however not compulsory.

The head part 12 and the shaft part 14 are made hollow here and a thread cylinder 30 is provided both in the head part 12 and also in the shaft part 14. The thread cylinder 30 is provided with a thread run-in 32 and with a thread run-out 34.

Alternatively to this, the punch-in element can be designed in such a way that a bolt shaft without a thread is formed at the outer side of the head part (not shown).

The punch-in element 10 is, as is shown in FIGS. 2A to 2E, arranged at a first sheet metal part 40 for the formation of a pre-installation unit 42. In this connection the previously described punch-in element is pressed with the free end to the fore in accordance with FIG. 2A coming from above so far into the pre-pierced sheet metal part 40 that an end part 44 of the shaft part 14 projects out of the sheet metal part 40. In this connection some but not all of the longitudinal ribs 20 are displaced fully or partly from the end part 44 of the shaft part 14 with the aid of a die button 50 which will later be described in more detail and are reshaped to material noses 52, i.e. sheared and upset as is evident from FIGS. 2D and 2E. The material noses 52 engage radially into the material of the sheet metal part 40, fully or partly, and indeed in such a way that the sheet metal part 40 is trapped between the noses and the sheet metal contact surface 18. The remaining, not scraped away longitudinal ribs 20 are, as likewise evident from FIGS. 2D and 2E, still present at the end part.

Figure 3A:
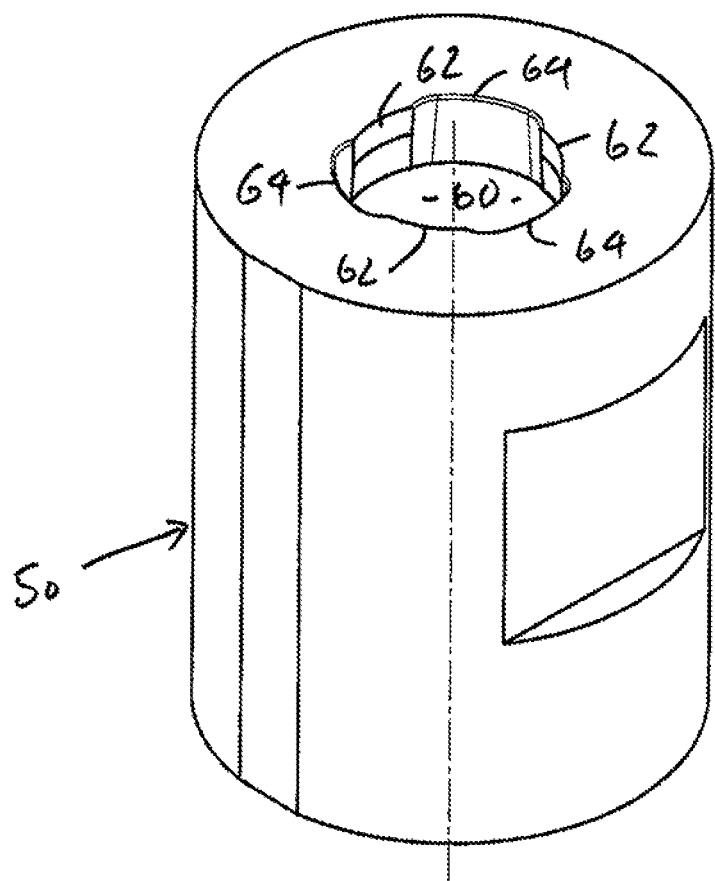
Figure 3B:
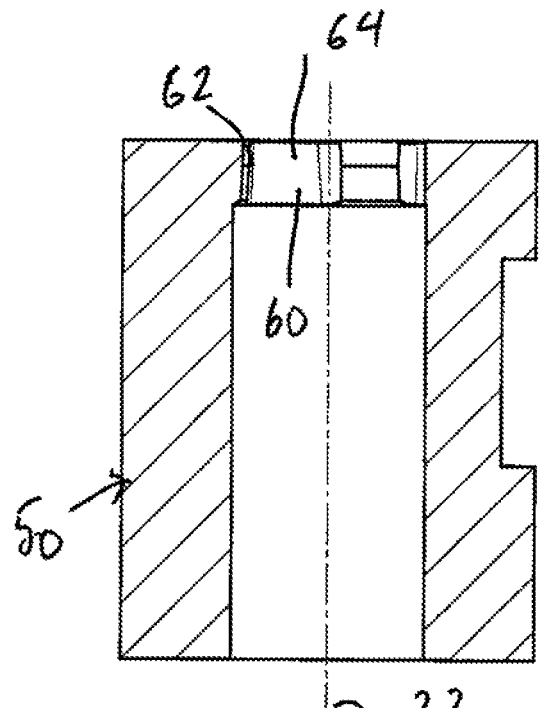
Figure 3C:
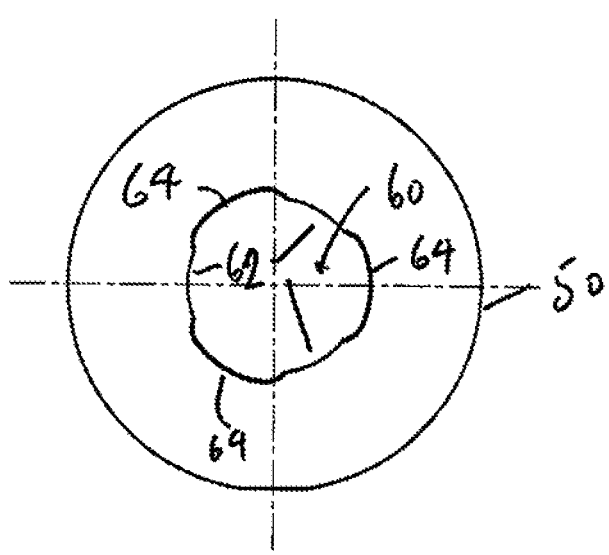

The method for the manufacture of the pre-installation unit thus takes place as follows: The first sheet metal part 40, for example, a boat as explained above, is first pre-pierced with a hole diameter which corresponds substantially to the diameter D2 of the shaft part, i.e. with a radius D2/2 which can however also be fractionally smaller or larger. The sheet metal part 40 is subsequently supported on a die button 50 having a passage 60 as is shown in FIGS. 3A to 3C. The passage 60 has at least first and second alternating regions 62 and 64 respectively around its periphery, with the first regions 62 having a radius D2/2 from the central longitudinal axis 22 of the punch-in element 10, which corresponds to the radius D2/2 of the shaft part 14. The second regions 64 have a radius from the central longitudinal axis 22 of the punch-in element 10 which corresponds to the radius Rr of the outer sides of the longitudinal ribs 20 from the central longitudinal axis 22 of the punch-in element 10.

The total number of the small regions 62 and of the larger regions 34 correspond approximately to half the total number of longitudinal ribs 20 so that the longitudinal ribs 20 can be scraped away pairwise by the regions 62, whereas further alternating pairs of longitudinal ribs are aligned with the larger regions 64 and are not scraped away. A particular orientation of the die button or of the punch-in element is not required. Even if—as a result of unfavorable orientation—a region 62 of smaller radius should be aligned with, for example, three longitudinal ribs it would fully scrape away the central longitudinal rib and parts of each of the two adjacent longitudinal ribs 20, which is not tragic, because here adequate material noses 52 and adequate longitudinal rib remainders (full or partly) are present in order to ensure the required security against rotation.

In this embodiment two adjacent longitudinal ribs 20 are reshaped by means of the die button 50, since for the next ribs in the peripheral direction the die button 50 has a cutout (region 64) so that the longitudinal ribs 20 there are not reshaped. For this arrangement no orientation is required in the direction of rotation since in each case only half of all ribs is affected. Even if the die button is by chance orientated so that the transition from reshaping to non-reshaping lies in the region of one rib to two half reshaped ribs and one fully reshaped rib arise.

It is, however, in no way necessary to specify a specific ratio between the total number of the regions 62 or 64 and the total number of longitudinal ribs or to select the same angular extents of the regions 62, 64. It is only necessary to pay attention to the fact that an adequate number of material noses 52 and an adequate number of remaining longitudinal ribs or longitudinal rib parts remain at the end part 44 in order to guarantee the desired security against rotation.

Figure 4A:
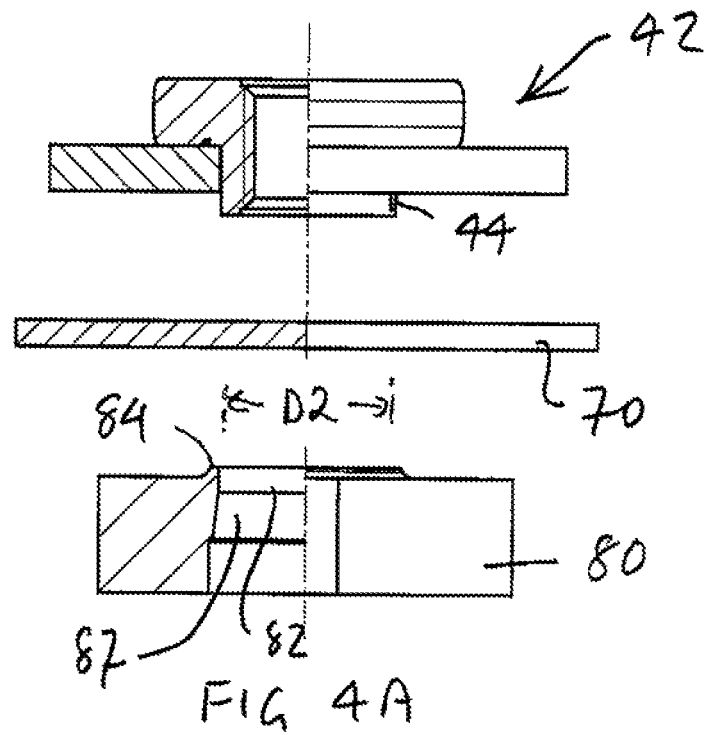
FIG. 4C shows the second sheet metal part removed from the component assembly of FIG. 4B.

The method for the manufacture of a component assembly 70 consisting of the above-described pre-installation unit 42 and a second sheet metal part 70 will now be described with reference to FIGS. 4A, 4B and 4C. FIG. 4C shows the second sheet metal part (70) removed from the component assembly of FIG. 4B to show the hole rim (71) and the grooves (72) therein. Here the second non pre-pierced sheet metal part 70 is supported in FIG. 4A on a second die button 80. The latter has a central passage 82 with a diameter corresponding to D2, to the base diameter D2 of the end part 44 of the shaft part 14 of the punch-in element 10 and also a ring nose 84 arranged around the central passage 82. By pressing the pre-installation unit 42 with the end 24 of the end part 44 to the fore against the side 86 of the second sheet metal part 70 remote from the die button 80, the end part 44 generates, with the aid of the die button 80, a hole 88 in the second sheet metal part and a piercing slug 90 which drops through the broadened region 87 of the die button 80 and is disposed of. The ring nose 84 generates a ring recess 92 in the side 94 of the second sheet metal part 70 remote from the head part 12 around the end part 44. The ring recess 92 which is provided in the side of the second sheet metal part 70 remote from the first sheet metal part 40 thus surrounds the end part 44.

The still remaining longitudinal ribs 20 at the end part 44 of the shaft part 14 form grooves (not evident) in the side wall of the hole 88 which serves through a corresponding form-fit with the longitudinal ribs for a good security against rotation.

This is increased or supplemented by the hole friction and the hole friction also serves for considerable press-out resistance. The ring recess 92 increases the hole friction and can also, to a small but also highly effective extent, form a further form-fitted engagement with the shaft part 14 in the region of its end part 44, which further increases the press-out resistance. The shaft part 14 is however substantially not deformed at least in the region of the thread 30.

Figure 4B:
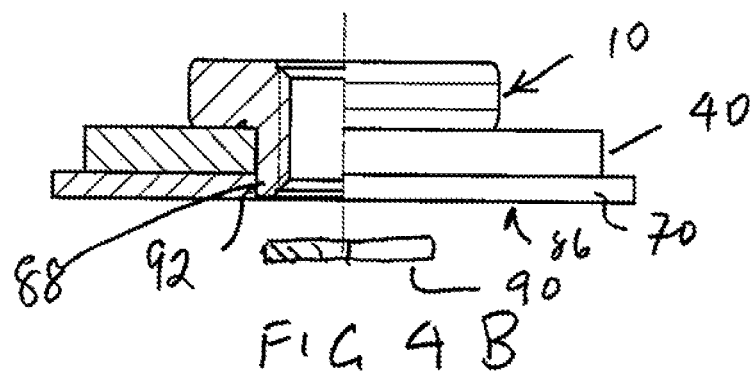
Figure 4C:
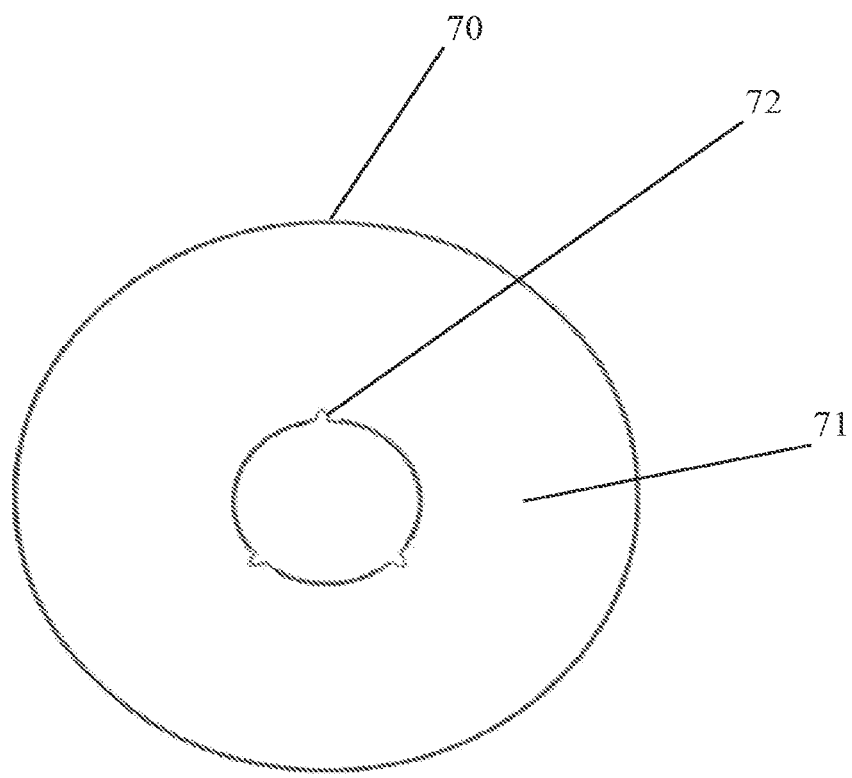

The result of this method is the component assembly 100 in accordance with FIG. 4B consisting of the pre-installation unit 42 and the second sheet metal part 70. Simply by way of example the first sheet metal part 40 can have a thickness in the range from 2.0 to 4 mm or larger, whereas the second sheet metal part can have a thickness from 0.6 to 1.8 mm, with these values not to be understood as being restrictive.

As a material for the punch-in element all materials can be considered—without restriction—which are able to satisfy a fastener element of the strength class 8.8 or higher in accordance with the DIN norm.

The invention claimed is:

1. A pre-installation component comprising at least one pre-pierced sheet metal part (40) into which at least one punch-in element (10) has been pressed, the punch-in element (10) having a hollow head part (12) of larger transverse dimension (D1), a hollow shaft part (14) having an internal thread (30), an outer periphery and a free end and being of smaller transverse dimension (D2) than the head part, the hollow shaft part projecting away from one side (16) of the head part (12), there being an annular sheet metal contact surface (18) formed at the one side (16) of the head part (12) and surrounding the hollow shaft part (14), and a plurality of longitudinal ribs (20) at the outer periphery of the hollow shaft part (14) which extend in an axial direction along the hollow shaft part (14) from the sheet metal contact surface (18) to close to a free end (24) of the hollow shaft part (14); the punch-in element being pressed into the sheet metal part with the free end (24) to the fore, to such an extent that an end part (44) of the hollow shaft part (14) of the punch-in element projects out of the sheet metal part; wherein some but not all of the longitudinal ribs (20) are fully or partly displaced from the end part (44) of the hollow shaft part (14) and reshaped into material noses (52) by being sheared and compressed, with the material noses (52) engaging radially into the material of the sheet metal part (40) fully or partly contacting the sheet metal part and the sheet metal part (40) being clamped between the noses (52) and the sheet metal contact surface (18) and wherein the remaining non-displaced longitudinal ribs (20) are still present at the end part (44).

2. The component assembly comprising the pre-installation component (42) of claim 1 and a second sheet metal part (70), wherein the end part (44) is introduced in a self-piercing manner into the second sheet metal part (70) with the formation of a hole (88) having a hole rim in the second sheet metal part, whereby the remaining not displaced longitudinal ribs (20), which are still present at the end part (44), engage in form-fitted manner in grooves of the hole rim.

3. The component assembly in accordance with claim 2, wherein an annular recess (92) is provided in a side (86) of the second sheet metal part (70) remote from the first sheet metal part (40) and surrounds the end part (44).

4. The component assembly in accordance with claim 2, wherein the hollow shaft part (14) is at least substantially not de-formed in the area of the internal thread (30).

5. A method for the manufacture of a pre-installation component (42) consisting of a sheet metal part (40) and a punch-in element (10) having a hollow head part (12) of larger transverse dimension (D1) and a shaft part (14) of smaller transverse dimension (D2) which projects away from one side (16) of the head part, wherein a ring-shaped sheet metal contact surface (18) is formed at the one side of the head part (12) and surrounds the shaft part, with a plurality of ribs (20) at an outer periphery of the shaft part (14) which extend in an axial direction along the shaft part from the sheet metal contact surface (18) up to close to a free end (24) of the shaft part (14), wherein the sheet metal part is pre-pierced with a hole diameter D2 which corresponds to the diameter D2 of the shaft part; wherein the sheet metal part is supported on a die button (50) having a passage (60), the die button having at least first and second alternating regions (62, 64) around the passage (60), with the first regions (62) having a radius (R) from a central longitudinal axis (22) of the punch-in element (10) which corresponds to the radius (D2/2) of the shaft part (14) and the second regions having a radius (Rr) from the central longitudinal axis (22) of the punch-in element (10) which corresponds to the radius (Rr) of outer sides of the longitudinal ribs (20) from the central longitudinal axis (22) of the punch-in element (10).

6. A method for the manufacture of a component assembly (100) consisting of the pre-installation component (42) manufactured in accordance with claim 5 and a second sheet metal part (70), wherein the second sheet metal part is not pre-pierced and supported on a die button (80) having a central passage (82) with a diameter (D2) corresponding to a base diameter (D2) of an end part (44) of the shaft part (14) of the punch-in element (10) and with a ring nose (84) arranged around the central passage, wherein, by pressing the pre-installation unit (42) with the free end (24) of the end part (44) to the fore against a side of the second sheet metal part (70) remote from the die button (80), the end part (44) generates a hole in the second sheet metal part and a piercing slug (90) with the aid of the die button (80) and the ring nose (84) forms a ring recess (92) in a side (86) of the second sheet metal part (70) remote from the head part (12) around the end part (44).

* * * * *